United States Patent [19]

Peters, Jr. et al.

[11] 4,149,167

[45] Apr. 10, 1979

[54] RADAR JAMMING TRANSMITTER

[75] Inventors: Philip H. Peters, Jr., Schenectady; Donald A. Wilbur, Albany, both of N.Y.

[73] Assignee: The United States of America as represented by the Secretary of the Army, Washington, D.C.

[21] Appl. No.: 492,327

[22] Filed: Mar. 4, 1955

[51] Int. Cl.² .......................... G01S 7/38; H04K 3/00
[52] U.S. Cl. ................................. 343/18 E; 343/18 D
[58] Field of Search ................. 250/17; 343/18, 18 D, 343/18 E

*Primary Examiner*—Malcolm F. Hubler
*Attorney, Agent, or Firm*—Nathan Edelberg; Jeremiah G. Murray; Edward Goldberg

EXEMPLARY CLAIM

1. An automatic radar jamming transmitter comprising a plurality of voltage-tuned magnetrons each adapted to be tuned over a prescribed wide range of frequencies, discrete voltage tuning means in circuit with each of said magnetrons respectively whereby each of said magnetrons initially and simultaneously generate radio-frequency energy at prescribed discrete frequencies, means for simultaneously varying said discrete voltage tuning means in a random manner whereby the discrete outputs of said magnetrons comprise simultaneously generated frequency modulated noise signals, means for amplifying said noise signals, and means in circuit with said amplifying means for producing random changes in the amplitudes of said noise signals.

11 Claims, 1 Drawing Figure

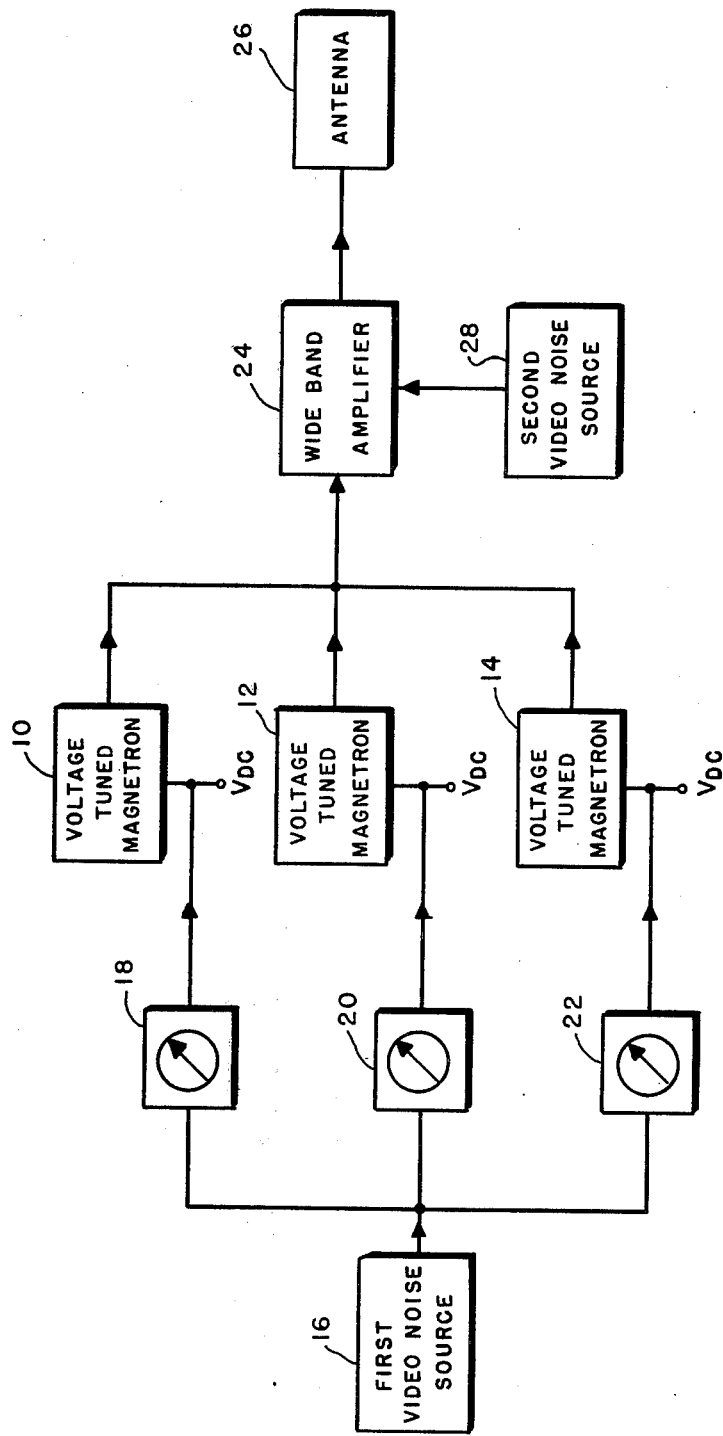

RADAR JAMMING TRANSMITTER

This invention relates to radar jamming devices and more particularly to automatically operated radar jamming transmitters employing noise modulated signals.

In countermeasures activity, it is desirable to utilize spot and/or barrage jamming against enemy radar and communication links for masking receivers with noise signals so that target echoes cannot readily be discerned. In order to effectively jam both AM and FM receivers, it is essential that the jamming signals be transmitted over a wide range of frequencies. Where time and manpower are at a premium, it is desirable to provide a jamming transmitter which will automatically provide spot and barrage jamming signals simultaneously over such a wide range of frequencies.

It is therefore an object of the present invention to provide a radar jamming transmitter having expandable noise bandwidth generators which may be automatically operated over a wide range of frequencies.

It is another object of the present invention to provide a jamming transmitter system for automatically generating a number of high power noise modulated radio-frequency signals whose respective center frequencies and noise bandwidths may each be individually and independently controlled.

In accordance with the present invention, there is provided a radar jamming transmitter having a plurality of voltage tuned magnetrons each adapted to be tuned over a prescribed range of frequencies. Included are discrete voltage tuning means in circuit with each of said magnetrons respectively whereby each of the magnetrons initially and simultaneously generate radio-frequency energy at prescribed discrete frequencies. Also included are means for simultaneously varying the discrete voltage tuning means in a random manner whereby the discrete outputs of the magnetrons comprise frequency modulated noise signals, means for amplifying the frequency modulated noise signals, and means in circuit with the amplifying means for producing random changes in the amplitude of the frequency modulated noise signals.

For a better understanding of the invention, together with other and further objects thereof, reference is had to the following description taken in connection with the accompanying drawing, in which the single FIGURE is a block schematic diagram showing a preferred embodiment of our ivention.

Referring now to the drawing, there are shown at 10, 12, and 14 three similarly constructed magnetron oscillators which are each adapted to be voltage tuned over a wide range of frequencies. The term "voltage-tuned magnetron" defines a magnetron whose output frequency is determined by and is proportional to the anode voltage, other operating parameters remaining constant. Such magnetrons are capable of being tuned over a wide range of frequencies by merely varying the magnitude of the applied anode direct-current anode voltage. One such magnetron is described in our application Ser. No. 360,328, filed June. 8, 1953, now abandoned. While only three such magnetrons are shown in the drawing for purposes of illustration, it is to be understood that this invention is not to be so limited and that any number of such magnetron oscillators may be utilized. A discrete constant operating center-frequency is produced from each magnetron by means of respective discrete direct-current anode voltages designated as $V_{DC}$ which are applied between the anode and cathode of the respective magnetron in the conventional manner.

The output of a first video noise source 16 is applied to each of the direct-current anode voltages as a modulating voltage. As shown, the noise signal for source 16 is applied to each of the magnetrons through discrete noise amplitude control circuits 18–22 for individually controlling themagnitude and/or phase of the video noise applied thereto. The outputs of the magnetrons 10–14 are each applied to the input of a traveling-wave type amplifier 24, or other suitable wideband amplifier, and the amplified output from amplifier 24 is fed to antenna 26. A second video noise source 28 similar in construction to first video noise source 16 is coupled to amplifier 24 in a manner such that the beam current or other suitable parameter of amplifier 24 is made to change in response to the power from second video noise source 28. By such an arrangement any radio-frequency signal passing through the amplifier 24 will be noise modulated in amplitude thereby producing sideband energy distributed over a bandwidth equal to twice the highest component in the video noise from source 28. Besides providing a large power gain and bandwidth, amplifier 24 provides effective isolation between the antenna 26 and the magnetrons 10-14. The coupling of the magnetron outputs to the input of traveling wave amplifier 24 may be accomplished by means of conventional hybrid circuits so as to minimize any interaction between the magnetrons.

In discussing the operation of the invention, first let us consider the action of just one of the voltage-tuned magnetrons in the system without any noise applied thereto. Other parameters held constant, the $V_{DC}$ voltage applied to the magnetron anode determines the center frequency of the radio-frequency signal fed to traveling wave amplifier 24. As explained hereinabove, this center frequency signal will be noise modulated in amplitude by the output of noise source 28 as it passes through the amplifier, thereby producing sideband energy distributed over a bandwidth equal to twice the highest frequency component from second noise source 28. If $V_{DC}$ is now changed to another value, the noise band output from amplifier tube 24 will move correspondingly and may be so tuned over the entire operating range of amplifier 24. The system thus far described provides fast electrical tuning of any desired number of noise modulated signals all having the same bandwidth. The power level of noise modulator 28 may be very small in comparison with the radio-frequency power it controls.

It is well known that if a varying modulating voltage is added to the $V_{DC}$ anode voltage, frequency modulation of the radio-frequency magnetron output is produced. The bandwidth covered by the energy in the resultant radio-frequency signal depends, of course, upon the modulation index. This bandwidth may be increased by increasing the modulation voltage or may be reduced by reducing the modulation voltage and it will have a minimum value equal to no less than twice the highest frequency contained in the modulation signal. Now, with video noise applied to the magnetron from source 16, the modulation due to this video noise will produce frequency modulated noise signals in the output of the magnetron. Thus, the output radio-frequency signal from any one magnetron will vary in a random maner and the sideband component pairs produced will vary randomly in frequency and amplitude.

However, all the random radio-frequency components always add to a constant peak-to-peak radio-frequency amplitude. When this frequency modulated signal has passed through amplifier 24 to antenna 26, it will exhibit random changes in amplitude and hence act upon any receiver as though it were "white" noise. Similarly, each of the radio-frequency components from the magnetrons 10-14 are amplitude modulated and as a result there are produced radio-frequency noise signals characterized by complete randomness in amplitude, frequency, and phase. It is to be noted that the bandwidth of the frequency modulated noise applied to amplifier 24 is not materially affected by the subsequent amplitude modulation due to second noise source 28. The amount of modulation, and hence the bandwith of any one noise signal from the amplifier 24 is adjusted by means of respective individual amplitude controls 18-22 which control the magnitude of the video noise applied to the magnetrons 10-14.

If desired, a sine wave or other periodic generator may be substituted for first video noise source 16, with the individual amplitude adjustments 18-22 providing different bandwidths on each jamming signal. By using a periodic generator source as the modulation voltage for the voltage tuned magnetrons, a definite set of coherent sidebands will be established, each separated from the other by the modulation rate. It is necessary, however, when using such a modulator, that the rate of periodic frequency modulation be less than the amplifier noise modulation bandwidth in order to produce a composite "white" noise signal. For any one magnetron, it has been found that if the periodic rate is 20 percent of the amplifier noise modulation bandwidth, there will be an overlapping of noise bands which will result in a composite white noise signal whose bandiwdth is a little wider than the periodic frequency modulated spectrum. Because of the overlapping effect, the amplitude of noise generated in this manner will vary over the frequency band to some extent. This may be minimized by lowering the modulation rate of the sine wave source.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An automatic radar jamming transmitter comprising a plurality of voltage-tuned magnetrons each adapted to be tuned over a prescribed wide range of frequencies, discrete voltage tuning means in circuit with each of said magnetrons respectively whereby each of said magnetrons initially and simultaneously generate radio-frequency energy at prescribed discrete frequencies, means for simultaneously varying said discrete voltage tuning means in a random manner whereby the discrete outputs of said magnetrons comprise simultaneously generated frequency modulated noise signals, means for amplifying said noise signals, and means in circuit with said amplifying means for producing random changes in the amplitudes of said noise signals.

2. The transmitter in accordance with claim 1 wherein said prescribed discrete frequencies are each substantially at the center of the range of frequencies for respective magnetrons.

3. An automatic radar jamming transmitter comprising a plurality of voltage-tuned magnetrons, each adapted to be tuned over a prescribed wide range of frequencies, discrete voltage tuning means in circuit with each of said magnetrons respectively whereby each of said magnetrons initially and simultaneously generate radio-frequency energy at prescribed discrete frequencies, a video noise source having its output coupled to each of said discrete voltage tuning means for simultaneously varying each of said voltage tuning means in a random manner whereby the discrete outputs of said magnetrons comprise frequency modulated noise signals, a wideband amplifier responsive to said noise signals, and means in circuit with said amplifier for producing random changes in the amplitudes of said noise signals.

4. An automatic radar jamming transmitter comprising a plurality of voltage-tuned magnetrons each adapted to be tuned over a prescribed wide range of frequencies, discrete voltage tuning means in circuit with each of said magnetrons respectively whereby each of said magnetrons initially and simultaneously generates radio-frequency energy at prescribed discrete frequencies, a first video noise generator having its output coupled simultaneously to each of said discrete voltage tuning means for varying each of said voltage tuning means in a random manner whereby the discrete outputs of said magnetrons comprise frequency modulated noise signals, a wideband amplifier responsive to said noise signals, and a second video noise generator having its output coupled to said amplifier for producing random changes in the amplitude of said noise signals.

5. The jamming transmitter in accordance with claim 4 and further including means for independently controlling the magnitude of the output of said first noise generator applied to each of said voltage tuning means.

6. An automatic radar jamming transmitter comprising a plurality of voltage-tuned magnetrons each adapted to be tuned over a prescribed wide range of frequencies, discrete voltage tuning means in circuit with each of said magnetrons respectively whereby each of said magnetrons initially and simultaneously generates radio-frequency energy at prescribed discrete frequencies, means for simultaneously varying said discrete voltage tuning in accordance with a periodically generated signal whereby the discrete outputs of said magnetrons comprise frequency modulated signals each having a set of coherent sidebands, means for amplifying said signals, and a video noise generator having its output coupled to said amplifier for randomly modulating said signals in amplitude.

7. The transmitter in accordance with claim 6 wherein the rate of periodic frequency modulation is less than the amplifier noise modulation bandwidth.

8. The transmitter in accordance with claim 6 wherein said periodically generated signal is a sine wave.

9. In a transmitter having a plurality of voltage-tuned magnetrons each adapted to be tuned over a prescribed wide range of frequencies, the method of producing radar jamming signals comprising the steps of individually voltage tuning each of said magnetrons for producing simultaneously generated radio-frequency energy at prescribed discrete frequencies, varying the individual voltage tuning applied to each of said magnetrons in a random manner simultaneously to produce frequency modulated noise signals, amplifying said frequency modulated noise signals, and randomly modulating the amplitude of said amplified noise signals.

10. In a transmitter having a plurality of voltage-tuned magnetrons each adapted to be tuned over a prescribed wide range of frequencies, the method of producing radar jamming signals comprising the steps of individually voltage tuning each of said magnetrons for producing simultaneously generated radio-frequency energy at prescribed discrete frequencies, generating random video noise, simultaneously varying the individual voltage tuning applied to each of said magnetrons by said video noise to produce discrete frequency modulated noise signals, independently adjusting the magnitude of the video noise applied to the voltage tuning of each magnetron, amplifying said frequency modulated noise signals, and amplitude modulating said amplified noise signals in a random manner.

11. In a transmitter having a plurality of voltage-tuned magnetrons each adapted to be tuned over a prescribed wide range of frequencies, the method of producing radar jamming signals comprising the steps of individually voltage tuning each of said magnetrons for producing simultaneously generated radio-frequency energy at prescribed discrete frequencies, varying the individual voltage tuning applied to each of said magnetrons in a random manner simultaneously to produce frequency modulated noise signals, varying the individual voltage tuning applied to each of said magnetrons in accordance with a periodically generated signal for producing discrete frequency modulated signals each having a set of coherent sidebands, amplifying said signals, and randomly modulating the amplitude of said amplified signals.

* * * * *